Dec. 28, 1965     H. L. ERICKSON     3,226,606
SOLENOID ASSEMBLY WITH PROTECTIVE ENCLOSURE
AND DEPENDING LIP
Filed Dec. 14, 1962
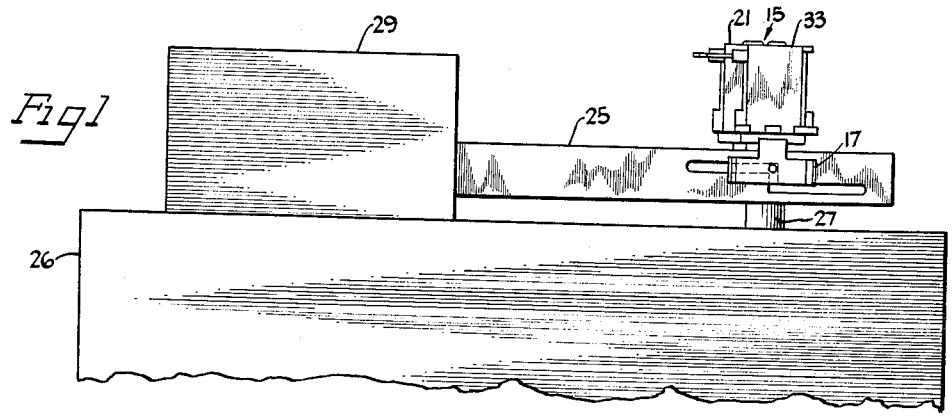
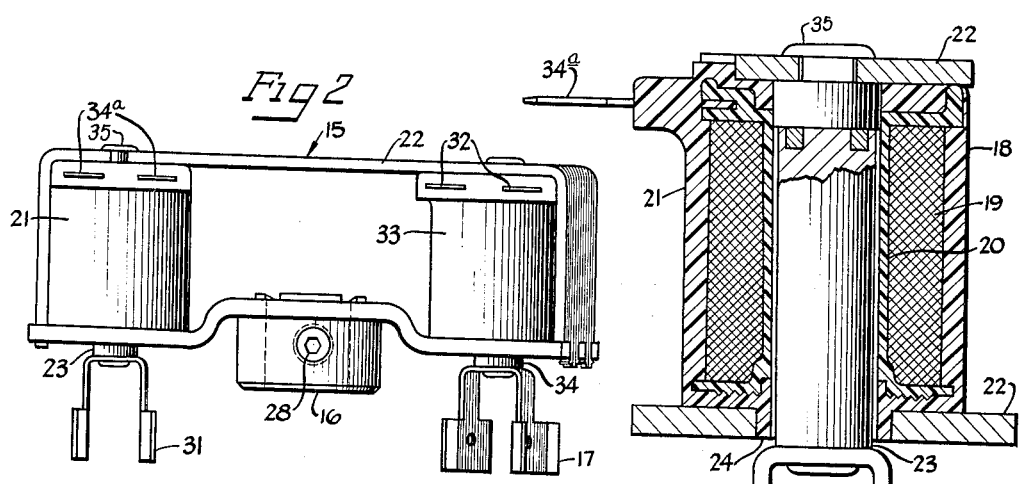
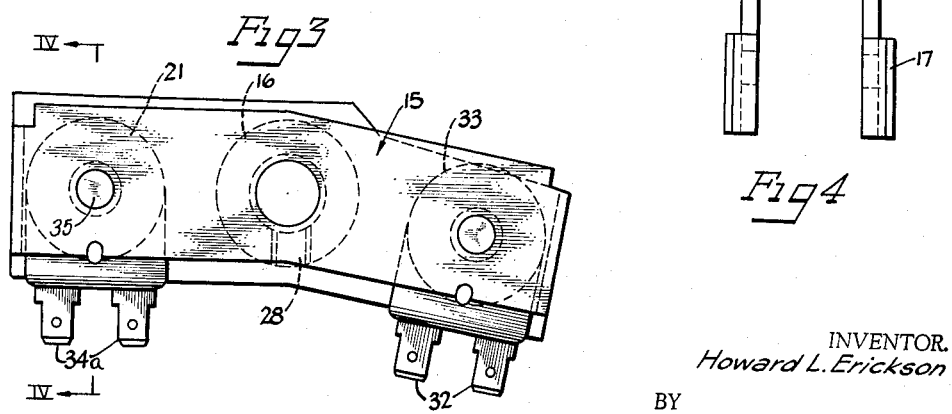
INVENTOR.
Howard L. Erickson
BY
ATTORNEYS

United States Patent Office 3,226,606
Patented Dec. 28, 1965

3,226,606
SOLENOID ASSEMBLY WITH PROTECTIVE ENCLOSURE AND DEPENDING LIP
Howard L. Erickson, Bensenville, Ill., assignor to The Dole Valve Company, Morton Grove, Ill., a corporation of Illinois
Filed Dec. 14, 1962, Ser. No. 244,606
3 Claims. (Cl. 317—191)

This invention relates to improvements in solenoids, and more particularly to a bushing construction for use as a bearing surface for the plunger of a solenoid.

The solenoid of this invention is designed for use in the shifting of transmission gears on an automatically controlled mechanism such as a washing machine. In such use, two solenoids are mounted on a frame which is in turn secured to an oscillating shaft. The operating end of each solenoid plunger is attached to a pivotal shift lever which extends to a control mechanism on the transmission. In operation, the frame (including the two solenoids mounted thereon) oscillates while the solenoid plungers move in and out (corresponding to the attracted and deenergized conditions respectively of each solenoid). This frame, with the two solenoids mounted thereon, is commonly called a wigwag assembly by reason of its movement.

It can be appreciated that as the frame oscillates, the solenoid plungers, in addition to their normal reciprocal movement, are also rotated slightly within each solenoid. Furthermore, during actuation of each shift rod, some sidewise forces are exerted on the plunger connected thereto.

In the past, solenoids have been used which have inherent weaknesses such as permit excessive wear between the plunger and the inner surface of the coil into which the plunger slides, and between the plunger and the frame which supports the solenoid. Various means have been devised to prevent the aforementioned problems, such as providing a metallic bushing to serve as a bearing surface for the solenoid plunger or the like. It has been found, however, that the problems of excessive wear, chatter, and economy have not been adequately solved.

It is therefore a primary object of this invention to provide a solenoid which is simple and economical to produce.

It is a further object to provide a solenoid which substantially reduces wear between the plunger and the frame which supports the solenoid, and between the plunger and the inner surface of the solenoid coil.

It is a further object to provide a molded bushing which serves as a bearing surface for the solenoid plunger.

It is a further object of this invention to provide a completely waterproof and dustproof solenoid coil.

Briefly, the embodiment of the invention described herein comprises a solenoid coil which has been incapsulated in one piece of molded plastic material such as nylon or other material having lubricating properties and friction resistance. The molded material is formed such that a portion thereof serves as a bearing surface for the solenoid plunger. The solenoid of this invention may be employed in a control device known as a wigwag assembly for used on the transmission of an automatic washing machine.

The invention will be more fully understood from the following detailed description of an embodiment thereof.

In the accompanying drawings:

FIGURE 1 is an elevational view showing the application of the solenoid of this invention within the transmission of a conventional washing machine.

FIGURE 2 is a side view of a wigwag assembly, showing the plunger of each solenoid and the connecting fingers which are secured to a transmission shift mechanism.

FIGURE 3 is a top view of a wigwag assembly, showing the shape of the frame in which the individual solenoids are mounted.

FIGURE 4 is a detailed view of a solenoid taken substantially along line IV—IV of FIGURE 3 showing the coil, spool, incapsulation, and the bushing which is formed from the incapsulating material.

Referring now to the drawings, it is seen that the washing machine transmission 26 has an oscillating shaft 27 extending therefrom. Wigwag solenoid 15 is mounted on shaft 27 by coupling 16 (shown in FIG. 2) which fits over shaft 27. Set screw 28 is tightened in order to secure wigwag assembly 15 to shaft 27. Shift lever 25 is attached to U-shaper connector finger 17 which extends from solenoid 33. Shift lever 25 extends to control mechanism 29. A second shift lever (not shown) on the opposite side of shaft 27 is substantially parallel to shift lever 25 and is attached to U-shaped connector fingers 31 (shown in FIG. 2) which extend from solenoid 21. Shaft 27 is constantly oscillated by a prime mover (not shown) and shifting of the gears is accomplished by actuation of solenoids 21 and 33.

Construction of the wigwag assembly 15 is shown in FIGURES 2 and 3. It is seen that solenoids 21 and 33 are mounted on opposite ends of a frame 22 with the plungers 23 and 34 extending through the lower part of the frame. Each plunger carries a U-shaped connector finger such as 17 or 31 at its lower extremity. Electrical terminals 32 and 34a extend from solenoids 33 and 21 respectively.

Since solenoids 21 and 33 are substantially identical, a description of solenoid 21 as shown in FIGURE 4 will suffice for both. The coil 19 is wound upon a spool 20 of insulating material. The spool and coil are then incapsulated in a non-magnetic material 18 with an opening extending through the center of the spool. One end of this opening recives plunger 23 and the other end a rivet slug 35 which serves both to mount the solenoid in frame 22, and as a plunger stop for plunger 23 to limit its attracted position.

It is noted that the incapsulating material 18 (which is of nylon or similar material) has a cylindrically shaped lip 24 at the open end of the spool. This lip 24 serves both as a bearing surface and as a guide for plunger 23 as it enters spool 20. Lip 24 extends a short distance into the entrance of spool 20, and to a point flush with or slightly beyond the lower surface of frame 22. Plunger 23 is in this manner both prevented from frictional contact against metal frame 22, and accurately guided into spool 20 by lip 24. It is evident from the foregoing that any side thrust imposed upon plunger 23 will be imparted directly to frame 22 to assure against damage to the inner surface of spool 20.

It will be appreciated that the bearing surface formed by lip 24 of the incapsulating material significantly reduces the cost of producing a completed solenoid by eliminating a bushing of other material, such as brass, which must be separately manufactured and assembled into the unit. Further advantages are afforded in that a material such as nylon has greater wear characteristics and shock resistance than its metallic counterparts. In addition, incapsulation of the coil support and coil renders the solenoid completely waterproof and dustproof.

While I have described the above principles of my invention in connection with a specific embodiment, it is to be clearly understood that this description is made only by way of example and not as a limitation to the scope and spirit of my invention as hereinafter claimed.

I claim as my invention:
1. In a solenoid:
a nonmagnetic coil support having a hollow opening extending therethrough,
a coil mounted on said coil support,
a reciprocable plunger of magnetically permeable material, said plunger extending into said opening in said coil support,
a frame through which said plunger extends,
a plunger stop extending into the other end of said opening in said coil support and being secured to said frame, said stop being engageable by said plunger to define the attracted position thereof,
and a coating of nonmagnetic material incapsulating said coil support and coil, said nonmagnetic coating having a substantially cylindrical lip formed thereon, said lip encircling said plunger and being positioned between said plunger and said frame to prevent said plunger from frictionally engaging said frame, said lip extending a short distance into one end of said hollow opening in said coil support to guide said plunger as it enters said coil support.

2. A solenoid constructed in accordance with claim 1 in which said bushing is formed of a lubricating plastic material.

3. In a solenoid,
a nonmagnetic tubular cylindrically shaped coil support having an axial cylindrical opening extending therethrough with the inner surface thereof providing a bearing surface,
an electrical coil annularly surrounding said coil support and nonmovably held thereby,
a rigid frame having a planar portion extending transversely relative to the axis of the coil support and having a circular opening coaxial with said coil support,
a nonmagnetic housing for the support,
said housing being formed of one piece molded material of a cylindrical shape with transverse circular end portions extending above and below said coil support and joining the coil support in a waterproof and dustproof engagement, said housing including an integral circular end portion with an axially extending integral cylindrically shaped annular projecting lip extending into the circular frame opening for the full depth thereof and supporting said housing coaxial with the opening in the frame and being provided with a cylindrical inner bearing surface coaxial with the coil support,
and a cylindrical plunger within the coil support having an operating end projecting beyond the frame opening and beyond the end of the lip and movable to project beyond the end of said lip in all positions thereof so that the lip is between the plunger and sides of the frame opening in all positions of the plunger whereby the plunger is protected from being worn and burred and is maintained in a center position.

References Cited by the Examiner
UNITED STATES PATENTS

| | | | |
|---|---|---|---|
| 2,449,438 | 9/1948 | Wisegarver | 317—191 |
| 2,734,153 | 2/1956 | Soreng et al. | 317—186 X |
| 2,899,609 | 8/1959 | Andrews | 317—191 |
| 2,956,312 | 10/1960 | Naimer. | |
| 3,010,055 | 11/1961 | Nicolaus | 317—191 |
| 3,043,994 | 7/1962 | Anderson et al. | 317—158 |

FOREIGN PATENTS 560,326   9/1957   Belgium.

JOHN F. BURNS, *Primary Examiner.*
JOHN P. WILDMAN, LARAMIE E. ASKIN,
*Examiners.*